United States Patent
Chou et al.

(10) Patent No.: US 10,483,782 B2
(45) Date of Patent: Nov. 19, 2019

(54) BATTERY CONTROL METHOD AND BATTERY CONTROL APPARATUS

(71) Applicant: Acer Incorporated, New Taipei (TW)

(72) Inventors: Shuo-Jung Chou, New Taipei (TW); Chuan-Jung Wang, New Taipei (TW)

(73) Assignee: ACER INCORPORATED, New Taipei (TW)

(*) Notice: Subject to any disclaimer, the term of this patent is extended or adjusted under 35 U.S.C. 154(b) by 171 days.

(21) Appl. No.: 15/707,653

(22) Filed: Sep. 18, 2017

(65) Prior Publication Data
US 2018/0316208 A1 Nov. 1, 2018

(30) Foreign Application Priority Data
Apr. 28, 2017 (TW) .............................. 106114201 A

(51) Int. Cl.
| | |
|---|---|
| *H02J 7/00* | (2006.01) |
| *G06F 1/26* | (2006.01) |
| *G06F 1/28* | (2006.01) |
| *H02J 7/04* | (2006.01) |

(52) U.S. Cl.
CPC .............. *H02J 7/0091* (2013.01); *G06F 1/26* (2013.01); *G06F 1/28* (2013.01); *H02J 7/0081* (2013.01); *H02J 7/045* (2013.01); *H02J 7/047* (2013.01)

(58) Field of Classification Search
CPC ...... H02J 7/0091; H02J 7/0081; H02J 7/0077; H02J 7/008; H02J 7/0085; H02J 7/0086; H02J 2007/0037; H02J 7/045; H02J 7/047; G06F 1/26; G06F 1/28
USPC ........................................................ 320/150
See application file for complete search history.

(56) References Cited

U.S. PATENT DOCUMENTS

| | | | | |
|---|---|---|---|---|
| 6,111,389 | A  | *  | 8/2000 | Aranovich ............ H02J 7/0091 320/150 |
| 2007/0120554 | A1 | | 5/2007 | Kawakami et al. |
| 2008/0024089 | A1 | * | 1/2008 | Meng ..................... H02J 7/0091 320/128 |
| 2009/0085527 | A1 | * | 4/2009 | Odaohhara ........... H02J 7/0091 320/150 |
| 2011/0068746 | A1 | * | 3/2011 | Rocci .................. H01M 10/441 320/118 |

FOREIGN PATENT DOCUMENTS

| | | |
|---|---|---|
| CN | 102214938 A | 10/2011 |
| TW | 468299 B | 12/2001 |
| TW | I574139 B | 3/2017 |

* cited by examiner

*Primary Examiner* — Nathaniel R Pelton
*Assistant Examiner* — Michael N Dibenedetto
(74) *Attorney, Agent, or Firm* — Birch, Stewart, Kolasch & Birch, LLP

(57) ABSTRACT

A battery control method and a battery control apparatus are provided. The battery control method includes the following steps. Whether a charging voltage value of a battery is greater than a voltage threshold is determined. When the charging voltage value is greater than the voltage threshold, a battery temperature of the battery is obtained. When the battery temperature is less than a first temperature, a time parameter is accumulated according to a first accumulating rate. When the time parameter reaches a time threshold, the charging voltage value of the battery is reduced.

10 Claims, 4 Drawing Sheets

BATTERY CONTROL METHOD AND BATTERY CONTROL APPARATUS

This application claims the benefit of Taiwan application Serial No. 106114201, filed Apr. 28, 2017, the subject matter of which is incorporated herein by reference.

BACKGROUND OF THE INVENTION

Field of the Invention

The invention relates in general to a control method and a control apparatus, and more particularly to a battery control method and a battery control apparatus.

Description of the Related Art

Rechargeable batteries are widely used in a variety of electronic devices, for example, mobile phones and notebook computers. However, a battery will start aging after leaving the factory. A battery has different aging rates due to different temperatures and different charging voltages.

If a battery is located in a high temperature environment, for example, the temperature is higher than 40 degrees Celsius, and is fully charged for a long time, the battery deteriorates rapidly and the aging rate of the battery will increase. The battery located in the high temperature environment and fully charged for a long time will expand severely, and the battery expansion will cause the electronic devices with swollen batteries broken. Therefore, there is a need to set the charging voltage according to the environment where the battery is located and the temperature of the battery.

SUMMARY OF THE INVENTION

The invention is directed to a battery control method and a battery control apparatus. Based on different usage conditions of a battery, such as ambient temperatures, a charging voltage value of the battery is adjusted to lower the aging rate of the battery, extend battery life, and decrease battery expansion rate.

According to one aspect of the present invention, a battery control method is provided. The battery control method includes the following steps. Whether a charging voltage value of a battery is greater than a voltage threshold is determined. When the charging voltage value is greater than the voltage threshold, a battery temperature of the battery is obtained. When the battery temperature is less than a first temperature, a time parameter is accumulated according to a first accumulating rate. When the time parameter reaches a time threshold, the charging voltage value of the battery is reduced.

According to another aspect of the present invention, a battery control apparatus is provided. The battery control apparatus includes a temperature sensing unit, a timing unit, a computing unit, and a processing unit. The temperature sensing unit is used for obtaining a battery temperature of a battery. The timing unit is used for storing a time parameter. The computing unit is used for accumulating the time parameter. The processing unit is used for determining whether a charging voltage value of the battery is greater than a voltage threshold. The processing unit notifies the computing unit to accumulate the time parameter according to a first accumulating rate when the battery temperature of the battery is less than a first temperature, and the processing unit notifies a charging unit to reduce the charging voltage value of the battery when the time parameter reaches a time threshold.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
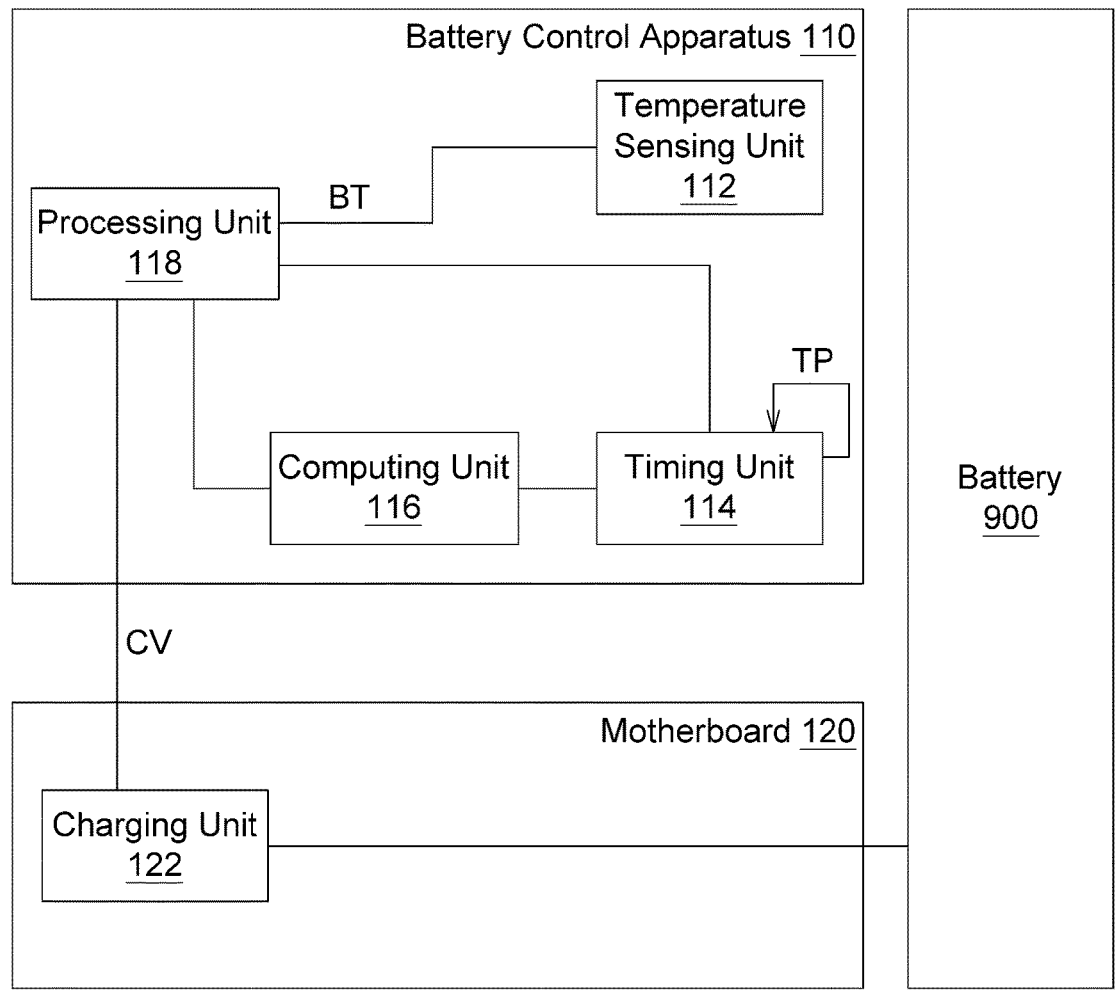
FIG. 1 shows a block diagram illustrating a battery control apparatus which has been operatively coupled to a motherboard and a battery.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Referring to FIG. 1, FIG. 1 shows a block diagram illustrating a battery control apparatus 110 which has been operatively coupled to a motherboard 120 and a battery 900. The battery control apparatus 110 includes a temperature sensing unit 112, a timing unit 114, a computing unit 116, and a processing unit 118. The processing unit 118 is coupled to the temperature sensing unit 112, the timing unit 114 and the computing unit 116. The computing unit 116 is coupled to the timing unit 114 and the processing unit 118. The motherboard 120 includes a charging unit 122. The charging unit 122 is coupled to the processing unit 118 of the battery control apparatus 110.

The temperature sensing unit 112, the timing unit 114, the computing unit 116, the processing unit 118, and the charging unit 122 could be, for example, implemented by a chip, a circuit block in the chip, a firmware circuit, a circuit board having several electronic elements and wires, or a storage medium storing a number of program codes, and could also be implemented by performing a corresponding software or program using an electronic apparatus, such as a computer system or a server.

Figure 2:
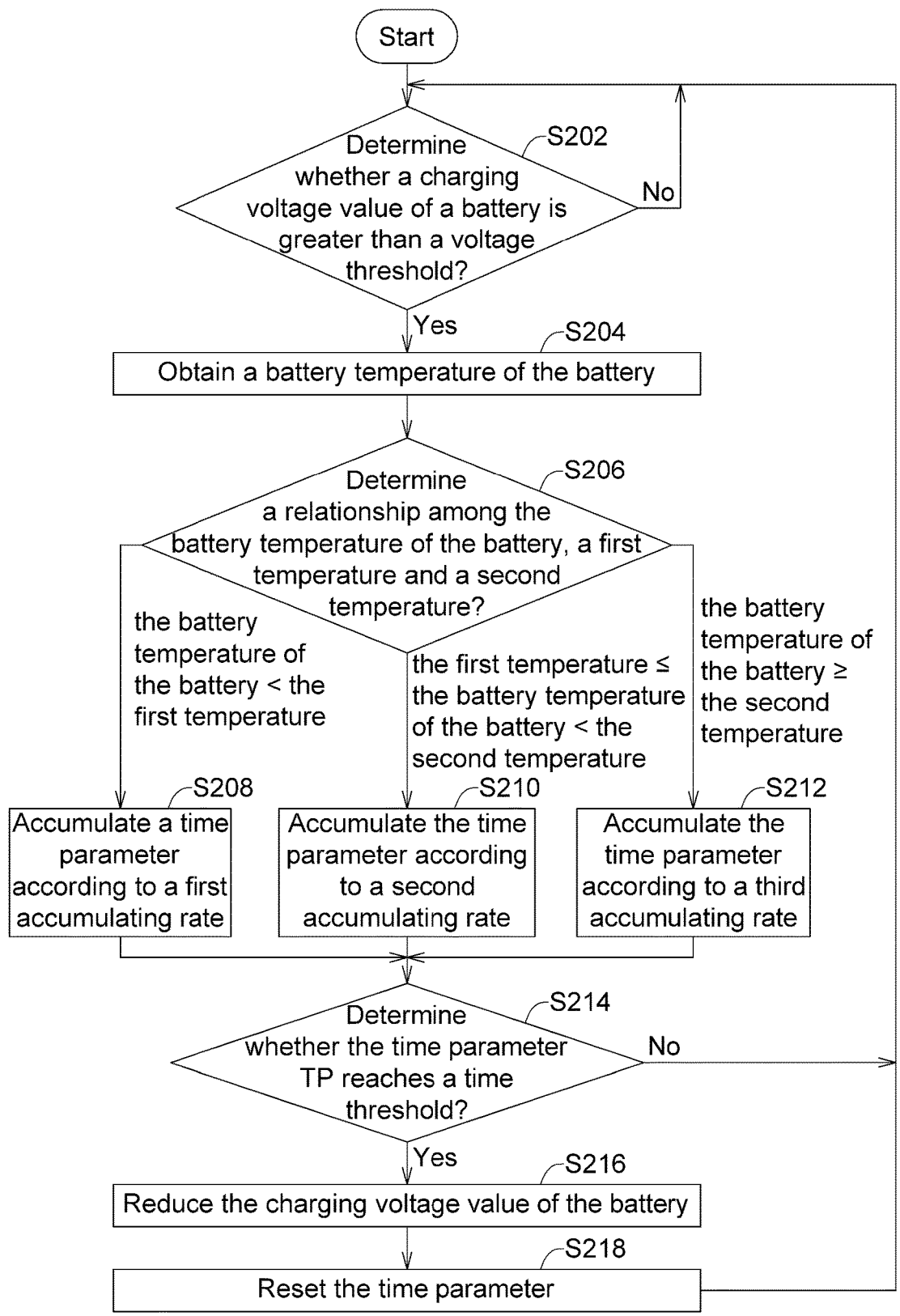
FIG. 2 illustrates a flowchart for a battery control method according to an embodiment of the present invention.

Please refer to FIGS. 1 and 2. FIG. 2 illustrates a flowchart for a battery control method according to an embodiment of the present invention. The battery control method illustrated in FIG. 2 can be applied on the battery control apparatus 110 illustrated in FIG. 1. To clearly illustrate the operation of the various elements of the above-described embodiment and the present embodiment, the battery control method for the battery control apparatus, with the following detailed description of the flowchart below. However, those skilled in the art can understand, the data processing method of the present embodiment is applied but not limited to the battery control apparatus 110 in FIG. 1, and it is not limited to the order of the steps of the flowchart illustrated in FIG. 2.

According to an embodiment of the present invention, at step S202, the processing unit 118 determines whether a charging voltage value CV of the battery 900 is greater than a voltage threshold. When the processing unit 118 determines that the charging voltage value CV of the battery 900 is not greater than the voltage threshold, the method proceeds to step S202 again. When the processing unit 118 determines that the charging voltage value CV of the battery 900 is greater than the voltage threshold, the method proceeds to step S204. At step S204, the temperature sensing unit 112 obtains the present battery temperature BT of the battery 900 and transmits the present battery temperature BT to the processing unit 118. At step S206, the processing unit 118 determines a relationship among the battery temperature BT of the battery 900, a first temperature and a second temperature.

In the present embodiment, three temperature intervals are determined according the first temperature and the second temperature, and the second temperature is greater than the first temperature. When the processing unit 118 determines that the battery temperature BT of the battery 900 is less than the first temperature, at step S208, the processing unit 118 notifies the computing unit 116 to accumulate a time parameter TP according to a first accumulating rate. When the processing unit 118 determines that the battery temperature BT of the battery 900 is greater than or equal to the first temperature but is less than the second temperature, at step S210, the processing unit 118 notifies the computing unit 116 to accumulate the time parameter TP according to a second accumulating rate. When the processing unit 118 determines that the battery temperature BT of the battery 900 is greater than or equal to the second temperature, at step S212, the processing unit 118 notifies the computing unit 116 to accumulate the time parameter TP according to a third accumulating rate. The accumulated time parameter TP is stored in the timing unit 114. The second accumulating rate is greater than the first accumulating rate, and the third accumulating rate is greater than the second accumulating rate.

Next, at step S214, the processing unit 118 determines whether the time parameter TP reaches a time threshold. When the processing unit 118 determines that the time parameter TP does not reach the time threshold, the process proceeds to step S202 again. When the processing unit 118 determines that the time parameter TP reaches the time threshold, the process proceeds to step S216. At step S216, the processing unit 118 notifies the charging unit 122 to reduce the charging voltage value CV of the battery 900. The processing unit 118 can reduce the charging voltage value CV of the battery by a voltage decreasing value, and the voltage decreasing value and the time threshold are positively correlated. In other words, the greater the time threshold is set, the greater the voltage decreasing value is. In addition, the reduced charge voltage value CV of the battery 900 is irreversible, that is, the reduced charge voltage value CV of the reduced battery 900 will not be increased again.

Then, at step S218, the processing unit 118 resets the time parameter TP. After resetting the time parameter TP, the process proceeds to steps S202. For example, in the step of resetting the time parameter TP, the time parameter TP can be reset to be zero or an initial value.

Figure 3:
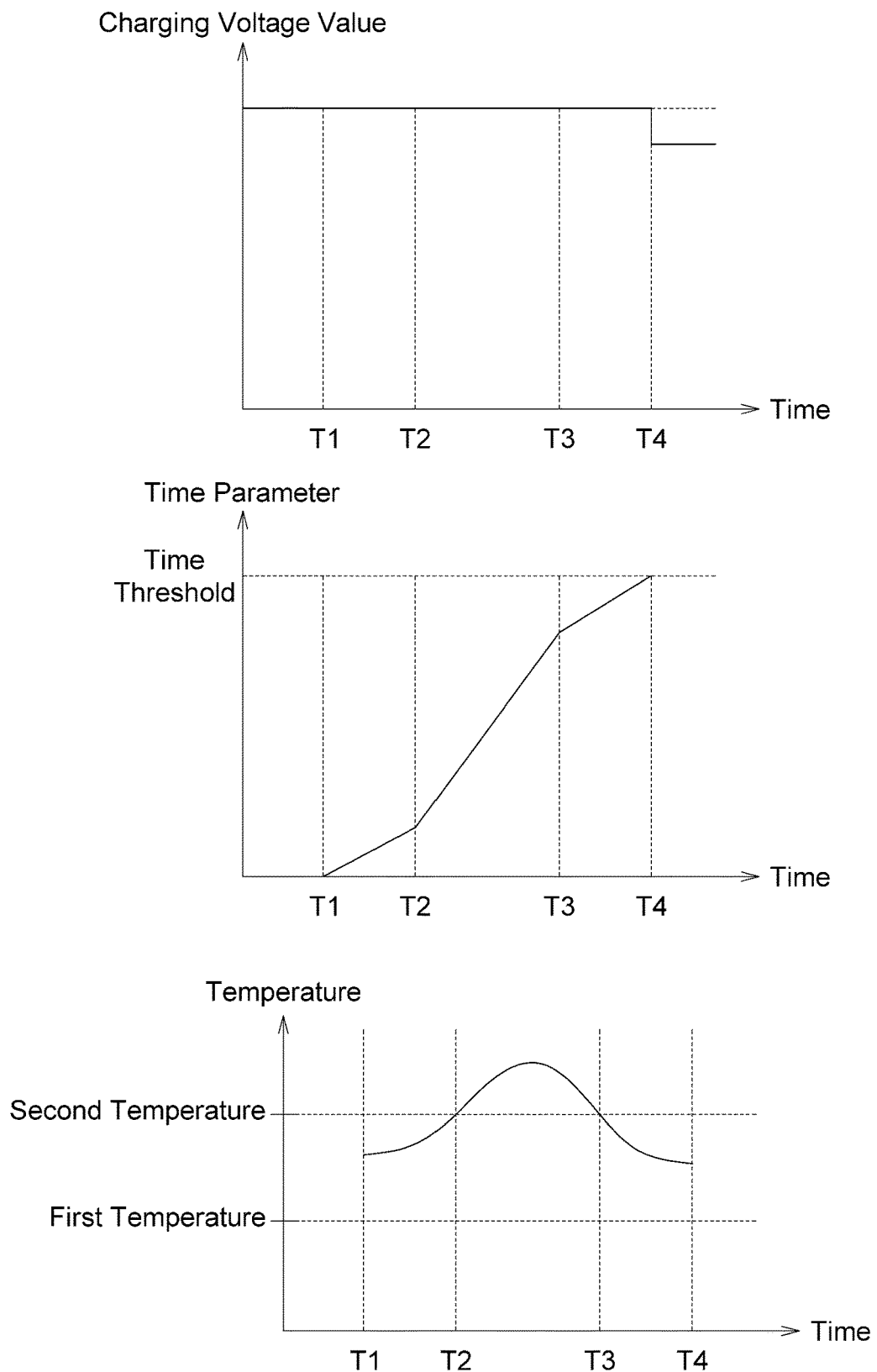
FIG. 3 shows a diagram illustrating accumulation of a time parameter according to an embodiment of the present invention.

Please refer to FIG. 3 which shows a diagram illustrating accumulation of a time parameter TP according to an embodiment of the present invention. In the present embodiment, a battery temperature BT of the battery 900 is greater than or equal to a first temperature and is less than a second temperature from time T1 to time T2. Therefore, the computing unit 116 accumulates a time parameter TP according to a second accumulating rate from time T1 to time T2. Next, after time T2 and before time T3, the battery temperature BT becomes greater than or equal to the second temperature, and the time parameter TP is accumulated according to a third accumulating rate. Then, after time T3, the battery temperature BT becomes greater than or equal to the first temperature and less than the second temperature, and the time parameter TP is accumulated according to the second accumulating rate. The time parameter TP reaches a time threshold at time T4. When the time parameter TP reaches the time threshold at time T4, the processing unit 118 reduces a charging voltage value CV of the battery 900.

In one embodiment of the present invention, the voltage threshold is set to 4.1V, the first temperature is set to 25 degree Celsius, the second temperature is set to 40 degree Celsius, and the time threshold is set to 1000. The values of the voltage threshold, the first temperature, the second temperature, and the time threshold described above are for illustrative purposes only, not intended to limit the present invention. Firstly, the processing unit 118 determines whether a charging voltage value CV of the battery 900 is greater than 4.1V (voltage threshold). When the charging voltage value CV of the battery 900 is greater than 4.1V, the temperature sensing unit 112 obtains the present battery temperature BT of the battery 900. The processing unit 118 determines that the present battery temperature BT of the battery 900 is less than 25 degree Celsius (first temperature), the present battery temperature BT of the battery 900 is greater than or equal to 25 degree Celsius (first temperature) and is less than 40 degree Celsius (second temperature), or the present battery temperature BT of the battery 900 is greater than or equal to 40 degree Celsius (second temperature).

When the present battery temperature BT of the battery 900 is less than 25 degree Celsius, the processing unit 118 notifies the computing unit 116 to accumulate a time parameter TP by adding 1 to the current time parameter TP (first accumulating rate), and the time parameter is adjusted. When the present battery temperature BT of the battery 900 is greater than or equal to 25 degree Celsius and is less than 40 degree Celsius, the processing unit 118 notifies the computing unit 116 to accumulate the time parameter TP by adding 1.5 to the current time parameter TP (second accumulating rate), and the time parameter is adjusted. When the present battery temperature BT of the battery 900 is greater than or equal to 40 degree Celsius, the processing unit 118 notifies the computing unit 116 to accumulate the time parameter TP by adding 2 to the current time parameter TP (third accumulating rate), and the time parameter is adjusted.

Then, the processing unit 118 determines whether the accumulated time parameter TP reaches 1000 (time threshold). If the accumulated time parameter TP does not reach 1000, the processing unit 118 re-determines whether the charging voltage value CV of the battery 900 is greater than 4.1V, and the time parameter TP is accumulated by different accumulating rates according to the battery temperature BT again. If the accumulated time parameter TP reaches (greater than or equal to) 1000, the processing unit 118 notifies the charging unit 122 to reduce the charging voltage value CV of the battery 900 by 0.02V (voltage decreasing value). The charging voltage value CV of the battery 900 is reduced. Next, the processing unit 118 resets the time parameter TP and re-determines whether the charging voltage value CV of the battery 900 is greater than 4.1V. The above-described process is performed again. It is for illustrative purposes only that the charging voltage value CV of the battery 900 is reduced by 0.02V, and the voltage decreasing value is not limited to 0.02V.

In another embodiment of the present invention, the voltage threshold is also set to 4.1V, the first temperature is set to 25 degree Celsius, the second temperature is set to 40 degree Celsius, the time threshold is set to 1000, and an initial value for the time parameter TP is set to 1. The values of the voltage threshold, the first temperature, the second temperature, the second temperature, the time threshold, and the time parameter described above are for illustrative purposes only, not intended to limit the present invention. Firstly, the processing unit 118 determines whether a charging voltage value CV of the battery 900 is greater than 4.1V (voltage threshold). When the charging voltage value CV of the battery 900 is greater than 4.1V, the temperature sensing unit 112 obtains the present battery temperature BT of the battery 900. The processing unit 118 determines a relationship among the present battery temperature BT, 25 degree Celsius (first temperature) and 40 degree Celsius (second temperature).

When the present battery temperature BT is less than 25 degree Celsius, the processing unit 118 notifies the computing unit 116 to accumulate a time parameter TP by multiplying the current time parameter TP by 1.1 (first accumulating rate), and the time parameter is adjusted. When the present battery temperature BT of the battery 900 is greater than or equal to 25 degree Celsius and is less than 40 degree Celsius, the processing unit 118 notifies the computing unit 116 to accumulate the time parameter TP by multiplying the current time parameter TP by 1.3 (second accumulating rate), and the time parameter is adjusted. When the present battery temperature BT of the battery 900 is greater than or equal to 40 degree Celsius, the processing unit 118 notifies the computing unit 116 to accumulate the time parameter TP by multiplying the current time parameter TP by 1.5 (third accumulating rate), and the time parameter is adjusted.

Then, the processing unit 118 determines whether the accumulated time parameter TP reaches 1000 (time threshold). If the accumulated time parameter TP does not reach 1000, the processing unit 118 re-determines whether the charging voltage value CV of the battery 900 is greater than 4.1V, and the time parameter TP is accumulated by different accumulating rates according to the battery temperature BT again. If the accumulated time parameter TP reaches (greater than or equal to) 1000, the processing unit 118 notifies the charging unit 122 to multiply the charging voltage value CV of the battery 900 by 0.99. The charging voltage value CV of the battery 900 is reduced. Next, the processing unit 118 sets the time parameter TP to 1 (the initial value) and re-determines whether the charging voltage value CV of the battery 900 is greater than 4.1V. The above-described process is performed again.

Based on the above-described embodiments, it is apparently understood that the time parameter TP is not only accumulated by the use of additions, but also by multiplications or other mathematical operations. All kinds of schemes used to adjust the time parameter belong to the scope of the present invention. Similarly, the charging voltage value CV of the battery 900 is not only adjusted by the use of subtractions, but also reduced by multiplications or other mathematical operations.

Figure 4:
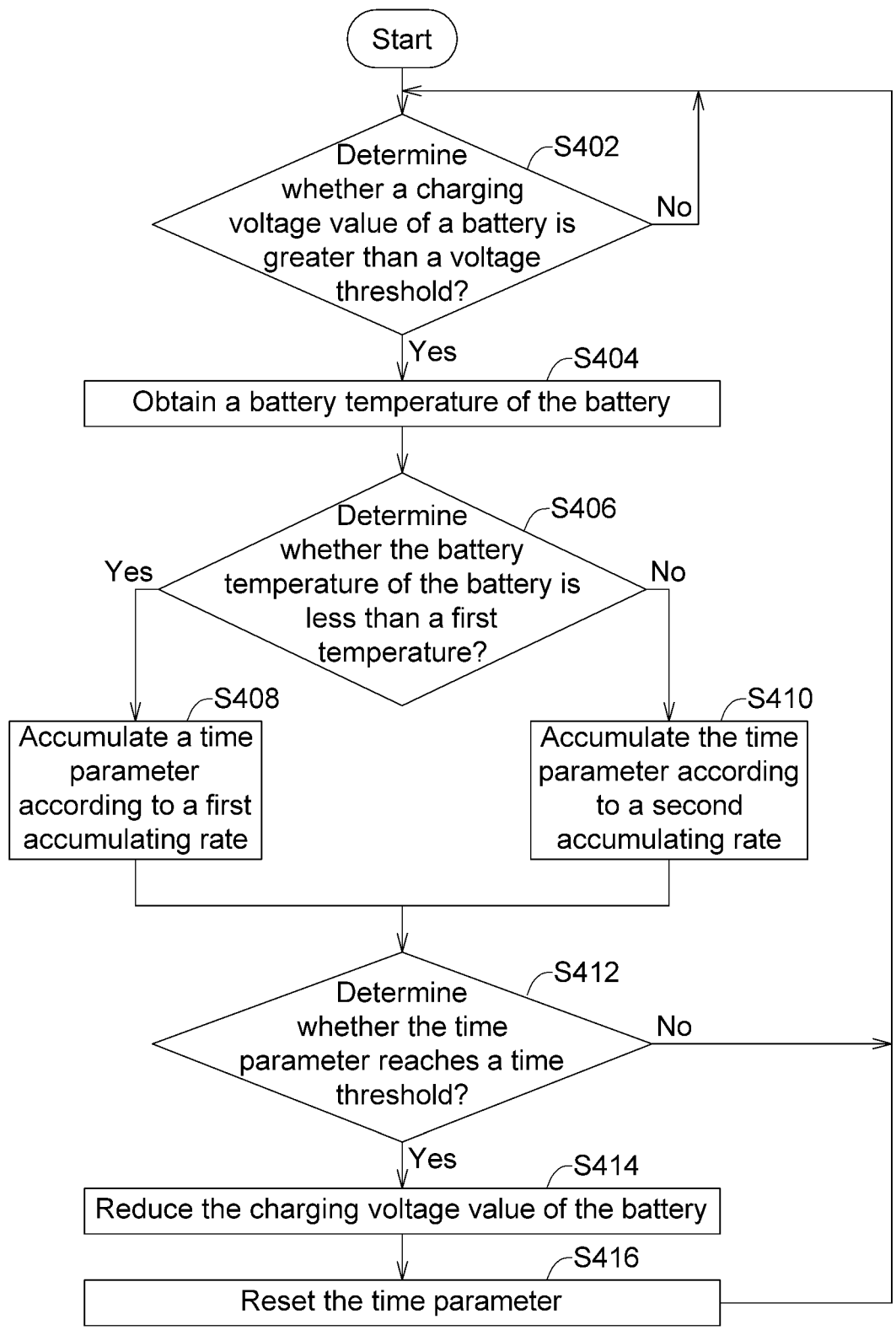
FIG. 4 illustrates a flowchart for a battery control method according to another embodiment of the present invention.

Please refer to FIGS. 1 and 4. FIG. 4 illustrates a flowchart for a battery control method according to another embodiment of the present invention. The battery control method illustrated in FIG. 4 can be applied on the battery control apparatus 110 illustrated in FIG. 1. To clearly illustrate the operation of the various elements of the above-described embodiment and the present embodiment, the battery control method for the battery control apparatus, with the following detailed description of the flowchart below. However, those skilled in the art can understand, the data processing method of the present embodiment is applied but not limited to the battery control apparatus 110 in FIG. 1, and it is not limited to the order of the steps of the flowchart illustrated in FIG. 4.

In this embodiment, only two temperature intervals are determined according to a first temperature. At step S402, the processing unit 118 determines whether a charging voltage value CV of the battery 900 is greater than a voltage threshold. When the processing unit 118 determines that the charging voltage value CV of the battery 900 is not greater than the voltage threshold, the method proceeds to step S402 again. When the processing unit 118 determines that the charging voltage value CV of the battery 900 is greater than the voltage threshold, the method proceeds to step S404. At step S404, the temperature sensing unit 112 obtains the present battery temperature BT of the battery 900 and transmits the present battery temperature BT to the processing unit 118. AT step S406, the processing unit 118 determines whether the battery temperature BT of the battery 900 is greater than a first temperature.

When the processing unit 118 determines that the battery temperature BT of the battery 900 is less than the first temperature, at step S408, the processing unit 118 notifies the computing unit 116 to accumulate a time parameter TP according to a first accumulating rate. When the processing unit 118 determines that the battery temperature BT of the battery 900 is greater than or equal to the first temperature, at step S410, the processing unit 118 notifies the computing unit 116 to accumulate the time parameter TP according to a second accumulating rate. The second accumulating rate is greater than the first accumulating rate.

Next, at step S412, the processing unit 118 determines whether the time parameter TP reaches a time threshold. When the processing unit 118 determines that the time parameter TP does not reach the time threshold, the process proceeds to step S402. When the processing unit 118 determines that the time parameter TP reaches the time threshold, the process proceeds to step S414. At step S414, the processing unit 118 notifies the charging unit 122 to reduce a charging voltage value CV of the battery 900. Then, at step S416, the processing unit 118 resets the time parameter TP. After resetting the time parameter TP, the process proceeds to steps S402 again.

In another embodiment of the present invention, no temperature intervals are determined according to a first temperature and/or a second temperature. A relationship between the accumulating rate for accumulating the time parameter TP and the battery temperature BT described above could be determined based on a linear relationship. For example, the scheme for accumulating the time parameter TP could be performing by adding one-tenth of the current temperature. When the battery temperature BT is 25 degree Celsius, the scheme for accumulating the time parameter TP is set to the current time parameter TP plus one-tenth of 25 (the current temperature), that is, the current time parameter TP plus 2.5, to adjust the time parameter TP. When the battery temperature BT is 50 degree Celsius, the scheme for accumulating the time parameter TP is set to the current time parameter TP plus one-tenth of 50 (the current temperature), that is, the current time parameter TP plus 5, to adjust the time parameter TP. The higher the battery temperature BT is, the greater a value for adjusting the time parameter is. The greater the value for adjusting the time parameter is, the more quickly the accumulated time parameter reaches the time threshold.

When the battery 900 is fully charged and in a high voltage state for a long time, the battery 900 will expand quickly. If the battery 900 is also located in a high temperature environment, the battery 900 will expand more quickly. In the embodiments of the present invention, it is determined whether the charging voltage value CV of the battery 900 is greater than the voltage threshold. When the charging voltage value CV of the battery 900 is greater than the voltage threshold, the time parameter TP is accumulated by different accumulating rates based on the battery temperature BT of the battery 900. When the time parameter TP reaches the time threshold, the charging voltage value of the battery 900 is reduced. According to the above-described embodiments of the present invention, the charging voltage value CV of the battery 900 is changed in accordance with long-term battery temperature BT changes and the long-term use of the battery 900 to slow the aging of the battery 900 and extend the life of the battery 900. The charging voltage value CV is not adjusted only based on the present usage situation and the present battery temperature BT. In addition, according to the above-described embodiments of the present invention, the expansion rate of the battery 900 would be reduced depending on the different usage situations.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A battery control method, comprising:
   determining whether a charging voltage value of a battery is greater than a voltage threshold;
   obtaining a battery temperature of the battery when the charging voltage value is greater than the voltage threshold;
   accumulating a time parameter according to a first accumulating rate when the battery temperature is less than a first temperature;
   accumulating the time parameter according to a second accumulating rate when the battery temperature is greater than or equal to the first temperature, wherein the first accumulating rate is less than the second accumulating rate; and
   reducing the charging voltage value of the battery when the time parameter reaches a time threshold.

2. The battery control method according to claim 1, further comprising:
   resetting the time parameter after reducing the charging voltage value of the battery.

3. The battery control method according to claim 2, further comprising:
   accumulating the time parameter according to a second accumulating rate when the battery temperature is greater than or equal to the first temperature and the battery temperature is less than a second temperature;
   wherein the second temperature is greater than the first temperature and the second accumulating rate is greater than the first accumulating rate.

4. The battery control method according to claim 3, further comprising:
   accumulating the time parameter according to a third accumulating rate when the battery temperature is greater than or equal to the second temperature;
   wherein the third accumulating rate is greater than the second accumulating rate.

5. The battery control method according to claim 1, wherein in the step of reducing the charging voltage value of the battery, a voltage decreasing value is subtracted from the charging voltage value;
   wherein the voltage decreasing value and the time threshold are positively correlated.

6. A battery control apparatus, comprising:
   a temperature sensing unit for obtaining a battery temperature of a battery;
   a timing unit for storing a time parameter;
   a computing unit for accumulating the time parameter;
   a processing unit for determining whether a charging voltage value of the battery is greater than a voltage threshold, wherein the processing unit notifies the computing unit to accumulate the time parameter according to a first accumulating rate when the battery temperature of the battery is less than a first temperature, the processing unit notifies the computing unit to accumulate the time parameter according to a second accumulating rate when the battery temperature is greater than or equal to the first temperature, the first accumulating rate is less than the second accumulating rate, and the processing unit notifies a charging unit to reduce the charging voltage value of the battery when the time parameter reaches a time threshold.

7. The battery control apparatus according to claim 6, wherein the processing unit resets the time parameter after reducing the charging voltage value of the battery.

8. The battery control apparatus according to claim 7, wherein the processing unit notifies the computing unit to accumulate the time parameter according to a second accumulating rate when the battery temperature is greater than or equal to the first temperature and the battery temperature is less than a second temperature;
   wherein the second temperature is greater than the first temperature and the second accumulating rate is greater than the first accumulating rate.

9. The battery control apparatus according to claim 8, wherein the processing unit notifies the computing unit to accumulate the time parameter according to a third accumulating rate when the battery temperature is greater than or equal to the second temperature;
   wherein the third accumulating rate is greater than the second accumulating rate.

10. The battery control apparatus according to claim 6, wherein the processing unit reduces the charging voltage value of the battery by a voltage decreasing value, and the voltage decreasing value and the time threshold are positively correlated.

* * * * *